US007158216B2

(12) United States Patent
Okada

(10) Patent No.: US 7,158,216 B2
(45) Date of Patent: Jan. 2, 2007

(54) HEAT DEVELOPING APPARATUS

(75) Inventor: Koichi Okada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 109 days.

(21) Appl. No.: 10/948,315

(22) Filed: Sep. 24, 2004

(65) Prior Publication Data

US 2005/0068516 A1    Mar. 31, 2005

(30) Foreign Application Priority Data

Sep. 25, 2003   (JP)   ............ P.2003-333946

(51) Int. Cl.
  *G03B 27/00*  (2006.01)
  *G03B 27/32*  (2006.01)
  *G03G 15/22*  (2006.01)
(52) U.S. Cl. .................. 355/405; 355/27; 399/130
(58) Field of Classification Search ........ 355/401–408, 355/27, 29, 53; 396/575; 399/130, 166, 399/154, 148, 361
See application file for complete search history.

(56) References Cited

U.S. PATENT DOCUMENTS 5,975,772 A * 11/1999 Imai et al. ............. 396/575

6,208,410 B1 * 3/2001 Kuwabara ............... 355/405
6,295,114 B1 * 9/2001 Agano et al. ............ 355/27
2003/0151729 A1 * 8/2003 Oono .................... 355/40

FOREIGN PATENT DOCUMENTS

JP   2000-343746 A   12/2000
JP   2003-5337 A    1/2003

* cited by examiner

Primary Examiner—Rodney Fuller
Assistant Examiner—Kevin Gutierrez
(74) Attorney, Agent, or Firm—Sughrue Mion, PLLC

(57) ABSTRACT

A heat developing apparatus comprising an image exposure portion in which a heat development recording material containing a heat development photosensitive material or a photosensitive heat-sensitive recording material is exposed to light to thereby form a latent image, and a heat developing portion in which heat is applied to said latent image to thereby develop said latent image, wherein: said image exposure portion is provided as a sub scanning type structure including a planar guide plate disposed on one side with respect to a carrying path of said heat development recording material, and two drive rollers disposed on other side with respect to said carrying path and having axes substantially parallel to said carrying path and crossing a carrying direction of said heat development recording material substantially perpendicularly; and a plurality of light-emitting elements are embedded in said guide plate so as to be arranged in a main scanning direction to form a light-emitting element array.

12 Claims, 9 Drawing Sheets

HEAT DEVELOPING APPARATUS

FIELD OF THE INVENTION

The present invention relates to a heat developing apparatus and particularly to a heat developing apparatus contributing to reduction in size and improvement in sharpness of an exposed image.

BACKGROUND OF THE INVENTION

Reduction in the amount of treated waste liquor has been intensively required recently from the point of view of environmental preservation and space saving in the field of medical treatment. It is therefore necessary to provide a technique concerning photosensitive heat development photographic materials which are used for medical diagnostic and photographic techniques and each of which can be exposed to light more efficiently by a laser imager so that a clear black image can be formed with high resolution and high sharpness. In these photosensitive heat development photographic materials, use of solution treating chemicals can be eliminated so that a heat developing system easier and not spoiling the environment can be provided to customers.

Although there is the same requirement in the field of general image-forming materials, a cold dark image is preferred as the medical image from the point of view of easy diagnosis as well as a high quality image excellent in sharpness and graininess is required because delicate depiction is required of the medical image. Although various hard copying systems such as an inkjet printer, an electrophotographic system, etc. using pigments and dyes are available as general image-forming systems, there is no satisfactory system currently used as a medical image output system.

On the other hand, a recording apparatus using a dry system not requiring any wet process has attracted public attention in recent years. In this type recording system, a film of a photosensitive and heat-sensitive recording material (photosensitive heat-sensitive recording material) or a heat development photosensitive material is used. This material will be hereinafter referred to as "heat development recording material" or "heat development photosensitive material". In the recording apparatus using a dry system, a laser beam is applied (scanned) on the heat development recording material in an exposure portion to form a latent image. Then, in a heat developing portion, the heat development recording material is brought into contact with heating means to perform heat development. Then, the heat development recording material is cooled slowly and cooled. Then, the heat development recording material on which the image has been formed is ejected from the apparatus. In the dry system, the problem of waste liquid treatment can be solved compared with the wet process.

For example, the aforementioned thermal image-forming systems using organic silver salt have been described in specifications of U.S. Pat. Nos. 3,152,904 and 3,457,075 and "Thermally Processed Silver Systems" (Imaging Processes and Materials) Noblette, the eighth edition, written by B. Shely, edited by Sturge, V. Walworth and A. Shepp, page 2, 1996. Particularly, the heat development recording material generally has a photosensitive layer in which a catalytic activity amount of photocatalyst (e.g. silver halide), a reducing agent and silver salt capable of being reduced (e.g. organic silver salt) are dispersed in a binder matrix and in which a color tone control agent for controlling the color tone of silver may be dispersed in the binder matrix if necessary. After image exposure, the heat development recording material is heated to a high temperature (e.g. 80° C. or higher) so that a black silver image is produced by an oxidation-reduction reaction between silver halide or reducible silver salt (functioning as an oxidizing agent) and the reducing agent. The oxidation-reduction reaction is accelerated by the catalytic action of the silver halide latent image produced by exposure. For this reason, the black silver image is formed in an exposure region. The heat development recording material has been disclosed in a lot of documents inclusive of U.S. Pat. No. 2,910,377 and Japanese Patent Publication No. 4924/1968, and a medical image-forming system using the heat development recording material has been developed (e.g. see Japanese Patent Laid-Open No. 2003-005337).

The heat developing apparatus provided as an image-forming system for medical treatment will be described with reference to FIG. 6.

In FIG. 6, the reference numeral 200 designates a heat development recording apparatus. The heat development recording apparatus 200 is an apparatus which uses a heat development recording material not requiring any wet developing process so that after the heat development recording material is exposed to a laser beam in a scanning exposure manner to form a latent image, the latent image is heat-developed to obtain a visible image, and then the heat development recording material is cooled slowly and cooled to the ordinary temperature. Basically, the heat development recording apparatus 200 has a heat development recording material supply portion A, an image exposure portion (laser recording unit) B', a heat developing portion C, a slow cooling portion D, and a cooling portion E. The portions A to E are arranged successively in the named order in the carrying direction of the heat development recording material. The heat development recording apparatus 200 further has carrying means provided at important positions between the respective portions for carrying the heat development recording material, and a power supply/control portion F for driving and controlling the respective portions.

The heat development recording apparatus 200 is formed so that the power supply/control portion F is disposed in the lowermost stage, the heat development recording material supply portion A is disposed above the power supply/control portion F, and the image exposure portion B', the heat developing portion C, the slow cooling portion D and the cooling portion E are disposed above the heat development recording material supply portion A. The image exposure portion B' and the heat developing portion C are disposed so as to be adjacent to each other.

According to this configuration, an exposure process and a heat developing process can be performed in a short carrying distance, so that the length of the carrying path of the heat development recording material can be minimized to thereby shorten the time required for outputting one sheet of the heat development recording material. Both the exposure process and the heat developing process can be applied to one sheet of the heat development recording material simultaneously.

The heat development recording material supply portion A is a portion for supplying the heat development recording material to the image exposure portion B' located in a downstream side in the carrying direction of the heat development recording material while taking out sheets of the heat development recording material one by one. The heat development recording material supply portion A includes three loading portions 10a, 10b and 10c, pairs of feed rollers 13a, 13b and 13c disposed in the loading portions 10a, 10b and 10c respectively, not-shown carrying rollers and not-shown carrying guides. The loading portions 10a, 10b and 10c form a three-stage structure. Magazines 15a, 15b and 15c in which sheets of heat development recording materials different in size (e.g. B4 size, half size, etc.) are stacked are inserted in the loading portions 10a, 10b and 10c respectively. Any one of the magazines 15a, 15b and 15c inserted in the loading portions 10a, 10b and 10c can be selected for use in accordance with the size and direction of the required heat development recording material.

Incidentally, the heat development recording material is processed into a sheet shape. Generally, a predetermined number of sheets of the heat development recording material are stacked (or bundled). For example, 100 sheets of the heat development recording material are stacked (or bundled). The bundle of sheets of the heat development recording material is packed in a bag, a belt or the like to form a package. Packages formed in this manner are put in the magazines respectively. The magazines are loaded into the respective stages of the heat development recording material supply portion A, respectively.

When a sheet of the heat development recording material is carried from the heat development recording material supply portion A to the image exposure portion B' by a carrying guide 14b, the image exposure portion B' exposes the sheet of the heat development recording material to a light beam L in the main scanning direction. Further, the sheet of the heat development recording material is carried in the sub scanning direction (i.e. carrying direction) substantially perpendicular to the main scanning direction, so that a desired image is recorded as a latent image on the sheet of the heat development recording material. The image exposure portion B' will be described later.

Next, the heat developing portion C will be described.

The heat developing portion C is used for heating the heat development recording material of the type subjected to heat treatment. As the configuration shown in FIG. 6, the heat developing portion C includes a plurality of plate heaters 51a, 51b and 51c which are provided as bodies heated to a temperature necessary for processing the heat development recording material 3 and which are curved in the carrying direction of the heat development recording material so as to be arranged like a circular arc.

That is, as shown in FIG. 6, the heat developing portion C including the plate heaters 51a, 51b and 51c is formed so that the plate heaters 51a, 51b and 51c have concave surfaces respectively. The heat development recording material 3 can be slid while brought into contact with the concave surfaces of the plate heaters, so that the heat development recording material 3 can be moved relative to the concave surfaces. A supply roller 53 and a plurality of pressure rollers 55 also used for transmitting heat from the plate heaters to the heat development recording material 3 are disposed as means for carrying the heat development recording material 3 on this occasion. The pressure rollers 55 abut on the circumferential surface of a drum 52 and are driven to rotate by the rotation of the drum 52. Metal rollers, resin rollers, rubber rollers, etc. may be used as the pressure rollers 55. According to this configuration, because the heat development recording material 3 is carried while pressed against the plate heaters 51a, 51b and 51c, the heat development recording material 3 can be prevented from buckling. Ejection rollers 57 for carrying the heat development recording material are provided at a terminal end of the carrying path of the heat development recording material 3 in the heat developing portion C.

The heat development recording material 3 fed out of the heat developing portion C is slowly cooled by the slow cooling portion D while care is taken to prevent the heat development recording material 3 from getting wrinkled or curly.

Pairs of slow cooling rollers 59 are disposed in the slow cooling portion D so that a desired predetermined radius R of curvature is given to the carrying path of the heat development recording material 3. What is meant by this is that the heat development recording material 3 is carried with the predetermined radius R of curvature until the heat development recording material 3 is cooled to a temperature not higher than the glass transition point of the material. Because the radius of curvature is given to the heat development recording material intentionally in this manner, the heat development recording material 3 can be prevented from being curled excessively before the heat development recording material 3 is cooled to a temperature not higher than the glass transition point. In addition, the heat development recording material 3 can be prevented from being curled newly after the heat development recording material 3 is cooled to a temperature not higher than the glass transition point. Accordingly, the amount of curl can be prevented from varying.

The temperature of the slow cooling rollers per se and the temperature of the inner atmosphere of the slow cooling portion D are regulated. This temperature regulation is provided so that the state of the heat treating apparatus just after the start of the heat treating apparatus and the state of the heat treating apparatus after sufficient running are equalized to each other as sufficiently as possible to thereby reduce variation in density.

The heat development recording material 3 cooled to a temperature not higher than the glass transition point by the slow cooling portion D is carried to the cooling portion E by a pair of slow cooling rollers 59 provided in the neighborhood of the outlet of the slow cooling portion D.

Cooling plates 61 are provided in the cooling portion E. In the cooling portion E, the heat development recording material 3 is further cooled to a temperature which does not cause a scald of the human hand when the human hand touches the heat development recording material 3. Then, the heat development recording material 3 is ejected to an ejection tray 16 by a pair of ejection rollers 63.

A heat development photosensitive material or a photosensitive heat-sensitive recording material can be used as the heat development recording material. The heat development photosensitive material is a recording material which can be used in such a manner that an image is recorded (exposed) by a light beam (such as a laser beam) and then colored by heat development. The photosensitive heat-sensitive recording material is a recording material which can be used in such a manner that an image colored by heat development after recorded by a light beam or an image recorded and colored simultaneously in a heat mode of a laser beam is fixed by light irradiation.

The laser image exposure portion B' will be described here specifically.

FIG. 7 is a configuration view showing the schematic configuration of a sub scanning carrying portion for carrying a sheet of the heat development recording material and a scanning exposure portion in the laser image exposure portion B'.

The laser image exposure portion B' is a portion for performing light beam scanning exposure so that the heat development recording material is exposed to a light beam.

The laser image exposure portion B' includes: a sub scanning carrying portion (sub scanning means) 17 having an anti-fluttering mechanism for carrying the heat development recording material while preventing the heat development recording material from fluttering relative to the carrying surface; and a scanning exposure portion (laser irradiation means) 19. The scanning exposure portion 19 scans a laser (in the main scanning direction) while controlling the output of the laser in accordance with image data provided separately. On this occasion, the heat development recording material is moved in the sub scanning direction by the sub scanning carrying portion 17.

The sub scanning carrying portion 17 has: two drive rollers 21 and 22 having axes arranged substantially in parallel to the main scanning line of the applied laser beam L so as to be opposite to each other with respect to the main scanning line; and a guide plate 23 disposed opposite to the drive rollers 21 and 22 and provided for supporting the heat development recording material 3. The guide plate 23 has slope portions 25 and 26, and a presser portion 29. The slope portions 25 and 26 are provided on the outside of the drive rollers 21 and 22 arranged side by side so that the heat development recording material 3 inserted between the guide plate 23 and each of the drive rollers 21 and 22 is distorted along a part of the circumferential surface of each drive roller. The presser portion 29 has a nearly horizontal surface which is provided between the drive rollers so that the nearly horizontal surface abuts on the heat development recording material while receiving elastic repulsive force caused by distortion of the heat development recording material.

The heat development recording material 3 enters the presser portion 29 while slipping down the slope portion 25, and passes through the presser portion 29 provided as a nearly horizontal surface. In this manner, the carrying path of the heat development recording material 3 is formed. The drive roller 21 provided opposite to the guide plate 23 gives force for carrying the heat development recording material 3.

The slope portion 25 is provided as an inclined surface which is bent at the boundary between the slope portion 25 and the presser portion 29 and connected to the presser portion 29. The crossing angle Φ between the slope portion 25 and the presser portion 29 is selected to be in a range of from 0° to 45°. The slope portion 26 on the downstream side in the carrying direction is formed in the same manner as the slope portion 25. The slope portion 26 is provided as a surface inclined at the crossing angle Φ to the presser portion 29. Incidentally, one inclined surface bent with a crossing angle Φ higher than 0° may be provided at least on the upstream side in the carrying direction.

When drive force of drive means such as a motor not shown is applied on the drive roller 21 through transmission means such as a gear, a belt, etc., the drive roller 21 rotates clockwise in FIG. 7. Incidentally, the drive roller 22 having the same configuration as that of the drive roller 21 is provided in the boundary between the slope portion 26 and the presser portion 29 for ejecting the heat development recording material 3.

The drive roller 21 will be described by way of example. The drive roller 21 is disposed opposite to a bent portion 31 which is the boundary between the presser portion 29 and the slope portion 25. FIG. 8 is a partly enlarged side view typically showing the position of the drive roller 21 relative to the guide plate 23. As shown in FIG. 8, the drive roller 21 is preferably disposed so that a line M passing through the bent portion (angular change point) 31 of the guide plate 23 and bisecting the inner angle (180°-Φ) of the guide plate 23 passes through the center of the drive roller 21. Incidentally, the relation between the diameter of the drive roller 21 and the length of the guide plate 23 is not particularly limited.

The drive roller 21 is also disposed so that a predetermined gap G is formed between the circumferential surface of the drive roller 21 and the guide plate 23. The gap G is preferably selected to be in a range of from t to 10 t (t≦G≦10 t) in which t is the thickness of the heat development recording material 3.

When the guide plate 23 is provided as a heat development processing portion, the surface of the guide plate 23 may be covered with fibers so that heat given from the heated guide plate 23 to the heat development recording material 3 can be optimized. In this case, the gap formed between the circumferential surface of the drive roller 21 and a front end of each fiber may be apparently zero because the recording material is carried while pushing down the front end of each fiber (see FIG. 7).

In the configuration of the sub scanning carrying portion 17, when the heat development recording material 3 enters the sub scanning carrying portion 17 at a front end of the slope portion 25, the front end of the heat development recording material 3 is put between the guide plate 23 and the drive roller 21. On this occasion, because the guide plate 23 is bent so that a predetermined angle Φ is formed between the presser portion 29 and the slope portion 25, the heat development recording material 3 is distorted when the heat development recording material 3 shifts from the slope portion 25 to the presser portion 29. This distortion generates elastic repulsive force in the heat development recording material per se. The elastic repulsive force causes predetermined frictional force between the heat development recording material 3 and the drive roller 21. As a result, carrying drive force is surely transmitted from the drive roller 21 to the heat development recording material 3, so that the heat development recording material 3 is carried. Incidentally, the coefficient of friction of the drive rollers 21 and 22 is larger than the coefficient of friction of the recording material contact surface of the guide plate 23.

The inclination angle Φ of the slope portion 25 (26) depends on the rigidity of the heat development recording material 3. When, for example, an imaging plate (IP) used in FCR9000 (trade name, sold by Fuji Photo Film Co., Ltd.) or an aluminum plate which is a photosensitive planar printing plate is used as the heat development recording material 3, the inclination angle Φ becomes low because the rigidity of the imaging plate or the aluminum plate is high. When, for example, a heat development recording material (using a film base) or a silver salt photosensitive material (using resin coated paper) is used as the heat development recording material 3, the inclination angle Φ becomes high because the rigidity of the heat development recording material or the silver salt photosensitive material is low. The inclination angle Φ depends on the rigidity of the heat development recording material 3. When, for example, a film base 175 μm thick is used as the heat development recording material 3, it is preferable that the inclination angle Φ is selected to be in a range of from 10° to 30°, and that the gap G is selected to be in a range of from 1 t to 5 t.

Also when the heat development recording material 3 is ejected from the guide plate 23 by the slope portion 26 and the drive roller 22, elastic repulsive force based on bending of the heat development recording material 3 causes generation of predetermined frictional force between the heat development recording material 3 and the drive roller 22 so that the heat development recording material 3 can be carried surely.

In the presser portion 29, the heat development recording material 3 is pressed against the presser portion 29 by the elastic repulsive force of the heat development recording material 3 so that the heat development recording material 3 can be prevented from fluttering relative to the carrying surface, that is, from fluttering vertically. When the laser beam L is applied on the heat development recording material 3 between the drive rollers, good recording free from displacement in exposure position can be performed.

On the other hand, the scanning exposure portion 19 is formed so that the laser beam L modulated according to an image signal is deflected in the main scanning direction and made incident on a predetermined record position X. As shown in FIG. 7, the scanning exposure portion 19 has: a laser beam source 35 for emitting a laser beam of a narrow wavelength band (wavelength: 350 nm to 900 nm) according to the spectral sensitivity characteristic of the heat development recording material; a recording controller 37 for driving the laser beam source 35; a cylindrical lens 39; a polygon mirror 41 serving as a beam deflector; an fθ lens 43; and a cylindrical lens 45 for trailing edge.

Incidentally, various optical members such as a collimator lens for shaping the laser beam emitted from the laser beam source 35, a beam expander, a surface drop correction optical system, an optical path adjusting mirror, etc. as disposed in a known light beam scanning exposure apparatus may be disposed in the scanning exposure portion 19 as occasion demands. Incidentally, the recording beam diameter of the laser beam applied on the heat development recording material 3 is selected to be in a range of from $\phi 50$ μm to $\phi 200$ μm. Particularly, the recording beam diameter in the sub scanning direction is preferably selected to be smaller to reduce the region of interference.

An exposure method is used here so that image recording is performed by pulse width modulation. The recording controller 37 drives the laser beam source 35 to perform pulse width modulation according to a recorded image so that a laser beam pulse-width modulated according to the recorded image is emitted from the laser beam source 35. The laser beam L emitted from the laser beam source 35 is deflected in the main scanning direction by the polygon mirror 41. The deflected laser beam is adjusted by the fθ lens 43 so as to be focused in the record position X. The optical path is selected by the cylindrical mirror 45. In this manner, the laser beam is made incident on the record position X at a predetermined incidence angle θi. That is, the laser beam L is applied on the heat development recording material 3 in the condition that the incidence angle θi of the laser beam L is inclined at an angle of from 4° to 15° in the sub scanning direction from a line normal to the heat development recording material 3 with respect to a plane parallel both to the normal line and to the sub scanning direction (carrying direction).

SUMMARY OF THE INVENTION

As described above, in accordance with the image-forming system for medical treatment shown in FIG. 6, a new product of a dry laser imager for printing an image in any kind of medical diagnostic imaging apparatus such as a CT or an MRI could be provided to achieve high-speed large-quantity processing and clean environment. The image-forming system could contribute to improvement in efficiency based on the dry film printing process and to improvement in working environment.

The chief characteristic of the image-forming system was ultra-high-speed processing. The film carrying mechanism could achieve ultra-high speed processing of about 180 half-size sheets per hour in the condition that about 65 sec was required for outputting the first film. Because the start-up time was only 10 minutes after the standby state in the power-saving mode, printing could be made speedily even in an emergency. With respect to handling property, because the image-forming system could be equipped with three trays at most, the image-forming system could satisfy diversification in film size (e.g. from a ⅙ size to a half size) in accordance with various diagnostic imaging apparatuses. A legible color liquid crystal display could be used. For example, animation display of operating procedures for film supplement, etc. could be used so that anyone could use this system easily and safely. Moreover, this system aimed at clean environment in response to environmental concerns. Even if image recording, image interpretation diagnosis, preservation, etc. were made by use of a dry image recording film produced by a "water type coating technique" which was proposed by the applicant of the present invention and in which water was used in place of an organic solvent for application of the heat development photosensitive material though the organic solvent was heretofore said to be essential, comfortable working environment could be achieved without production of any unpleasant odor.

The exposure was however based on a laser beam source. Accordingly, because it was necessary to use a polygon mirror for the exposure based on the laser beam source or it was necessary to use an optical lens system for moving the laser beam, it was necessary to provide a wide space in the apparatus.

On the other hand, a recording apparatus in which an array of organic electroluminescence light-emitting elements (hereinafter referred to as "organic EL light-emitting elements") is disposed in place of the laser beam source is commonly known (e.g. see Japanese Patent Laid-Open No. 2000-343746).

This is an invention for relieving light-emitting failure portions caused by the light-emitting elements. Organic EL light-emitting elements selected from the organic EL light-emitting elements constituting a light-emitting device in accordance with image information are switched on. The selected light-emitting elements emit light in the whole width in the sub scanning direction. The width of the emitted light in the sub scanning direction is converted into a desired width by a slit. The light is applied on a drum-shaped image carrier as a recording surface by the imaging characteristic of a gradient index lens array, so that desired image information is obtained by an electrophotographic process.

This recording apparatus is a recording apparatus of the type in which an image of toner formed on a photoconductor drum is transferred onto a sheet of transfer paper. That is, this recording apparatus is different from a recording apparatus using film exposure according to the prevent invention. The applicant has applied this recording apparatus to a heat developing apparatus using organic EL light-emitting elements in place of the laser beam.

FIG. 9 shows an image exposure portion of a heat developing apparatus using organic EL light-emitting elements produced by way of trial by the applicant. In FIG. 9, the reference numerals 711a and 711b designate guide plates for supporting the heat development recording material P; 712a and 712b, two drive rollers having axes arranged substantially in parallel to a scanning line; 713, an organic EL light-emitting device having EL light-emitting elements 714 arranged linearly in a row; and 715, a slit. The organic EL light-emitting element 714 side of the organic EL light-emitting device 713 is disposed opposite to the slit 715. Thus, the image exposure portion is formed.

The image exposure portion operates as follows.

The heat development recording material P is carried toward the slit 715 on the guide plate 711*a* by the drive roller 712*a*. When the heat development recording material P reaches the position on the slit 715, light-emitting elements selected from the organic EL light-emitting elements 714 of the organic EL light-emitting device 713 in accordance with image data are switched on to emit light (in the main scanning direction). In this manner, a latent image is formed on the heat development recording material P. The slit 715 is provided so that the light emitted from the organic EL light-emitting elements 714 can be prevented from being reflected. Then, after the heat development recording material P is moved by one pitch (in the sub scanning direction) by the drive rollers 712*a* and 712*b*, light-emitting elements selected from the organic EL light-emitting elements 714 of the organic EL light-emitting device 713 in accordance with image data are switched on again to emit light (in the main scanning direction). Thereafter, the aforementioned operation is repeated.

When a desired latent image is formed, the heat development recording material P is carried to a heat developing portion C as a next stage by the drive roller 712*b*.

In the image exposure portion using such organic EL light-emitting elements and configured as described above, the organic EL light-emitting device 713 is located on the guide plates 711*a* and 711*b* and at the lowermost portions of the slopes of the guide plates 711*a* and 711*b*. For this reason, dust derived from the heat development recording material P etc. is easily deposited on the organic EL light-emitting elements 714. Much labor is required for maintenance such as dust cleaning.

In addition, because there is the slit 715, the heat development recording material P can hardly come closely to the organic EL light-emitting elements 714. There is a possibility that a sharp image cannot be obtained.

The present invention is provided to solve the aforementioned problem and an object of the invention is to provide an exposure portion which can be greatly reduced in size compared with the laser exposure portion according to the background art and which can be maintained easily and can be used for producing a sharp image compared with the exposure portion using organic EL light-emitting elements provided as a trial product.

(1) To achieve the foregoing object, the invention provides a heat developing apparatus, wherein: an image exposure portion is provided as a sub scanning type structure including a planar guide plate disposed on one side with respect to a carrying path of a heat development recording material, and two drive rollers disposed on the other side with respect to the carrying path and having axes substantially parallel to the carrying path and crossing a carrying direction of the heat development recording material substantially perpendicularly; and a plurality of light-emitting elements are embedded in the guide plate so as to be arranged in a main scanning direction to form a light-emitting element array.

(2) According to the invention, in the heat developing apparatus described in the paragraph (1), the light-emitting elements are organic electroluminescence elements or light-emitting diodes.

(3) According to the invention, in the heat developing apparatus described in the paragraph (1) or (2), a pressure roller is provided on a side opposite to the light-emitting element array with respect to the heat development recording material carried to the image exposure portion.

(4) According to the invention, in the heat developing apparatus described in the paragraph (3), the pressure roller is a black rubber roller.

(5) According to the invention, in the heat developing apparatus described in the paragraph (1) or (2), light-emitting elements as another light-emitting element array are further provided on a side opposite to the light-emitting element array with respect to the heat development recording material carried to the image exposure portion.

(6) According to the invention, in the heat developing apparatus described in the paragraph (5), the two light-emitting element arrays disposed on opposite sides with respect to the heat development recording material emit light with wavelengths different from each other.

(7) According to the invention, in the heat developing apparatus described in any one pf the paragraphs (1) through (6), a temperature regulator is provided for regulating the temperature of the guide plate at a predetermined temperature.

(8) According to the invention, in the heat developing apparatus described in the paragraph (7), a heat sink is attached to the guide plate.

BRIEF DESCRIPTION OF THE DRAWINGS

FIG. 1 is a schematic configuration view of a heat development recording apparatus equipped with an image exposure portion according to the invention.

FIG. 2 is a perspective view of the image exposure portion according to a first embodiment of the invention.

[FIG. 3]

[FIG. 4]

FIG. 5 is a perspective view of the image exposure portion according to a fourth embodiment of the invention.

FIG. 6 is a schematic configuration view of a heat development recording apparatus equipped with an image exposure portion according to the background art.

FIG. 7 is a configuration view showing the schematic configuration of a sub scanning carrying portion for carrying a heat development recording material and a scanning exposure portion in a laser image exposure portion according to the background art.

FIG. 8 is a partly enlarged view typically showing the position of arrangement of drive rollers relative to a guide plate.

FIG. 9 is a perspective view of an image exposure portion produced by way of trial according to the invention.

DESCRIPTION OF REFERENCE NUMERALS AND SIGNS

Figure 1:
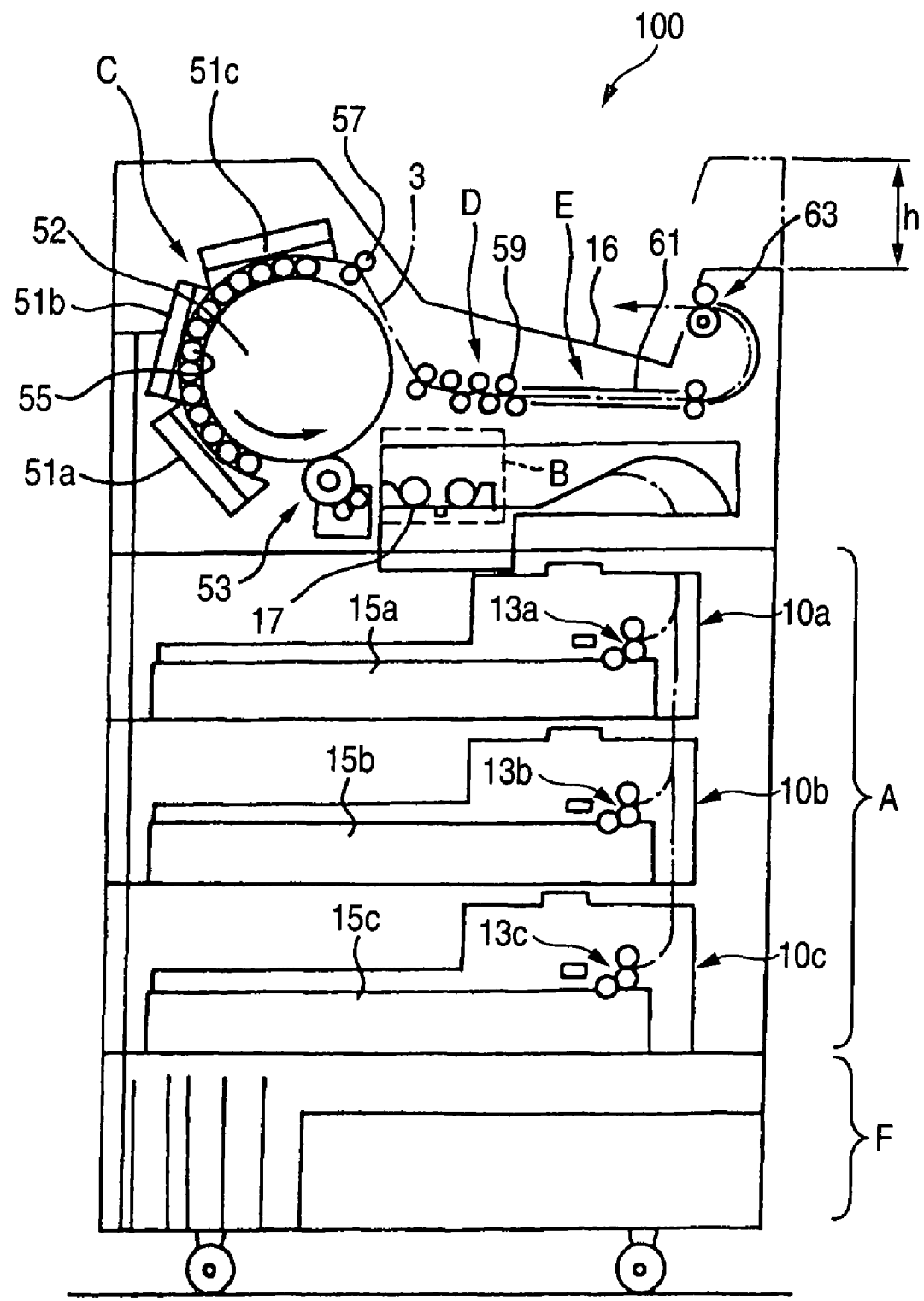
[FIG. 1]

A: heat development recording material supply portion
B: image exposure portion
C: heat developing portion
D: slow cooling portion
E: cooling portion
F: power supply/control portion
P: heat development recording material
111: guide plate
112a, 112b: drive roller
112c: pressure roller
114, 114': organic EL light-emitting device
115: heater
116: temperature regulator
117: cooling fan (heat sink).

DETAILED DESCRIPTION OF THE INVENTION

The best mode for carrying out the invention will be described below in detail with reference to the drawings. FIG. 1 is a schematic configuration view of a heat development recording apparatus equipped with an image exposure portion according to the invention. In FIG. 1, the reference numeral 100 designates a heat development recording apparatus. The heat development recording apparatus 100 is an apparatus which uses a heat development recording material not requiring a wet developing process and in which: the heat development recording material is exposed to a laser beam in a scanning exposure manner to form a latent image; the latent image is heat-developed to obtain a visible image; and then the heat development recording material is cooled slowly and cooled to the ordinary temperature. Basically, the heat development recording apparatus 100 has a heat development recording material supply portion A, an image exposure portion B, a heat developing portion C, a slow cooling portion D, and a cooling portion E. The portions A to E are arranged successively in the named order in the carrying direction of the heat development recording material. The heat development recording apparatus 100 further has: carrying means provided in important places between the respective portions for carrying the heat development recording material; and a power supply/control portion F for driving and controlling the respective portions.

The heat development recording apparatus 100 is formed so that the power supply/control portion F is disposed in the lowermost stage, the heat development recording material supply portion A is disposed above the power supply/control portion F, and the image exposure portion B, the heat developing portion C, the slow cooling portion D and the cooling portion E are disposed above the heat development recording material supply portion A. The image exposure portion B and the heat developing portion C are disposed so as to be adjacent to each other.

According to this configuration, an exposure process and a heat developing process can be performed in a short carrying distance, so that the length of the carrying path of the heat development recording material can be minimized to thereby shorten the time required for outputting one sheet of the heat development recording material. Both the exposure process and the heat developing process can be applied to one sheet of the heat development recording material simultaneously.

A heat development photosensitive material or a photosensitive heat-sensitive recording material can be used as the heat development recording material. The heat development photosensitive material is a recording material which can be used in such a manner that an image is recorded (exposed) by a light beam and then colored by heat development. The photosensitive heat-sensitive recording material is a recording material which can be used in such a manner that an image colored by heat development after recorded by a light beam or an image recorded and colored simultaneously is fixed by light irradiation.

The image exposure portion B concerns the invention. When a sheet of the heat development recording material is carried from the heat development recording material supply portion A to the image exposure portion B by a carrying guide 14b, the image exposure portion B exposes the sheet of the heat development recording material to light simultaneously in the main scanning direction. Further, the sheet of the heat development recording material is carried in the sub scanning direction (i.e. carrying direction) substantially perpendicular to the main scanning direction, so that a desired image is recorded as a latent image on the sheet of the heat development recording material.

Embodiments of the image exposure portion B according to the invention will be described below.

<First Embodiment>

Figure 2:
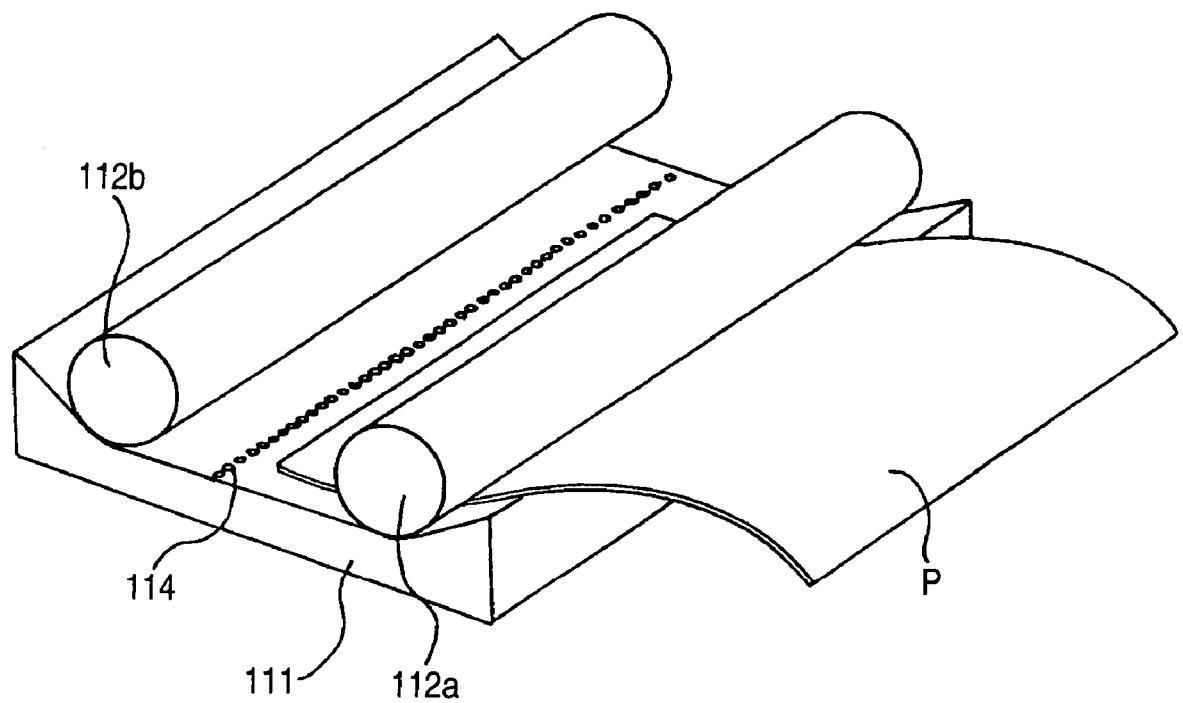
[FIG. 2]

FIG. 2 is a perspective view of the image exposure portion according to a first embodiment of the invention.

In FIG. 2, the reference numeral 111 designates a guide plate for supporting the heat development recording material P; 112a and 112b, two drive rollers having axes arranged substantially in parallel to a scanning line; and 114, anorganic EL light-emitting device having a large number of organic EL elements arranged linearly in a row. The organic EL light-emitting elements can cover the whole visible light region easily when organic materials used as light-emitting materials are selected. A lot of high-luminance high-efficiency materials have been developed in recent years. The life of each element has exceeded 10,000 hours in continuous operation. As is obvious from FIG. 2, the first embodiment is characterized in that the organic EL light-emitting device 114 is embedded in the guide plate 111.

The image exposure portion operates as follows.

Figure 9:
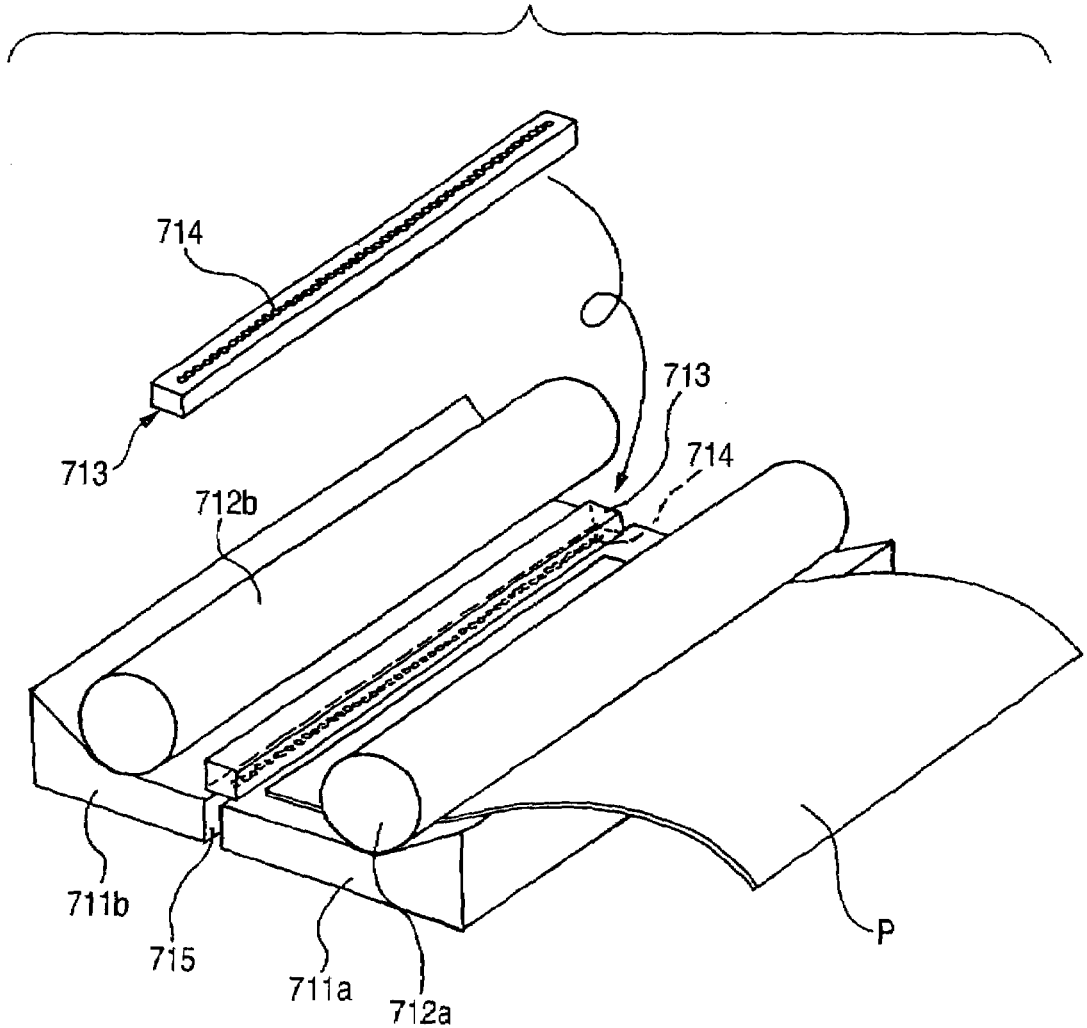
[FIG. 9]

When the heat development recording material P is carried toward the center on the guide plate 111 by the drive roller 112a, light-emitting elements which are selected from organic EL light-emitting elements in the organic EL light-emitting device 114 in accordance with image data are switched on to emit light (in the main scanning direction) to thereby form a latent image on the heat development recording material P. In the invention, the guide plate 111 is curved without provision of any slit 715 shown in FIG. 9. Moreover, the heat development recording material P is carried in such a direction that the heat development recording material P is pressed against the curved surface of the guide plate 111 by the drive rollers 112a and 112b. Accordingly, the heat development recording material P comes closely to the organic EL light-emitting device 114, so that a sharp image can be obtained.

The organic EL light-emitting device 114 is embedded in the guide plate 111. Because the front surface of the guide plate 111 is substantially flat, the guide plate 111 can be cleaned easily to attain easy maintenance.

<Second Embodiment>

Figure 3A:
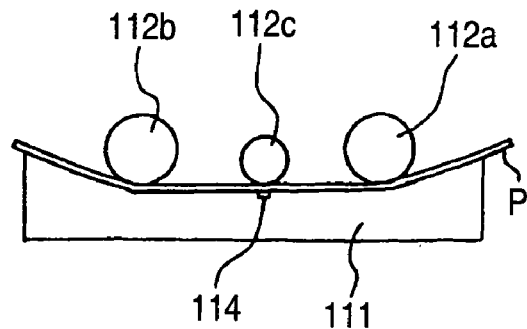
FIG. 3A is a sectional view of the image exposure portion according to a second embodiment of the invention.
Figure 3B:
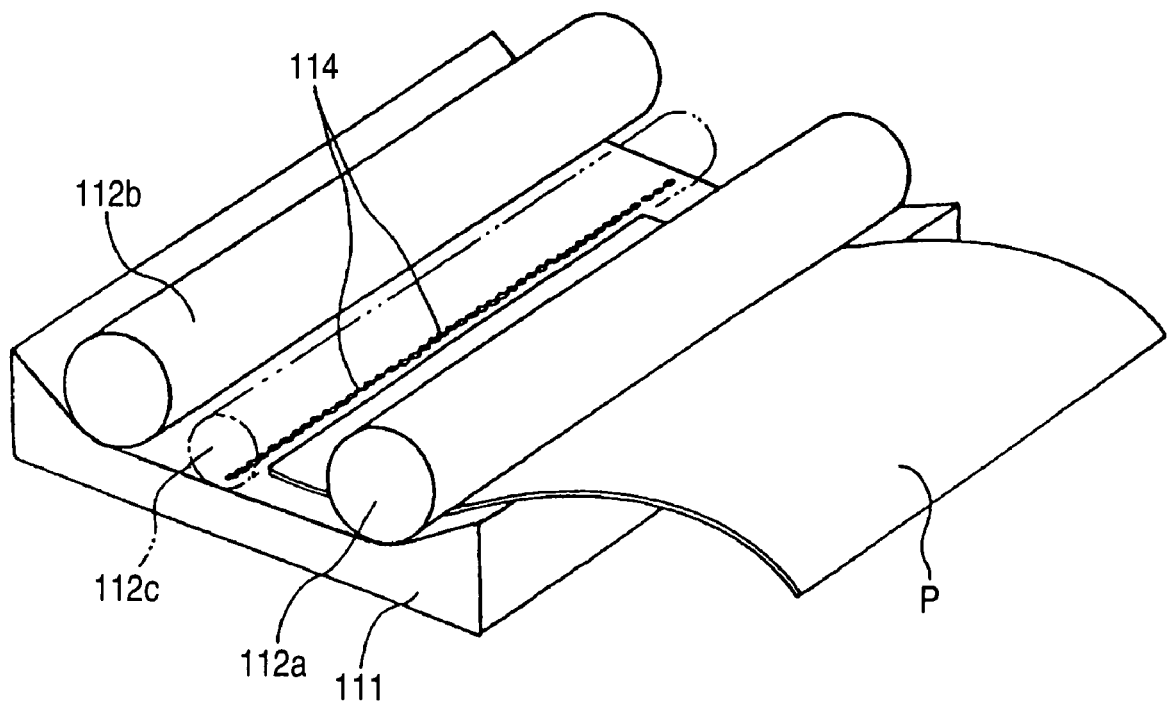
FIG. 3B is a perspective view of the image exposure portion according to the second embodiment of the invention.

FIGS. 3A and 3B are a sectional view and a perspective view of the image exposure portion according to a second embodiment of the invention.

In FIGS. 3A and 3B, the reference numeral 111 designates a guide plate for supporting the heat development recording material P; 112a and 112b, two drive rollers having axes arranged substantially in parallel to the scanning line; and 114, an organic EL light-emitting device having a large number of organic EL light-emitting elements arranged linearly in a row. The organic EL light-emitting device 114 is embedded in the guide plate 111. The description up to now is the same as in the first embodiment.

As is obvious from FIGS. 3A and 3B, the second embodiment is characterized in that a pressure roller 112c is provided on a side opposite to the organic EL light-emitting device 114 with respect to the heat development recording material P carried to the recording apparatus.

When a black rubber roller is used as the pressure roller 112c, light emitted from the organic EL light-emitting elements can be prevented from being reflected on the pressure roller 112c because the light is absorbed to the pressure roller 112c even in the case where the light reaches the pressure roller 112c. In addition, when the pressure roller 112c is made of rubber, the heat development recording material P can be prevented from slipping.

The image exposure portion operates as follows.

When the heat development recording material P is carried toward the center on the guide plate 111 by the drive roller 112a, light-emitting elements which are selected from the organic EL light-emitting elements contained in the organic EL light-emitting device 114 in accordance with image data are switched on to emit light (in the main scanning direction) to thereby form a latent image on the heat development recording material P. On this occasion, because the pressure roller 112c presses the heat development recording material P against the guide plate 111, the heat development recording material P comes more closely to the organic EL light-emitting device 114. Accordingly, an image sharper than that in the first embodiment can be obtained.

<Third Embodiment>

Figure 4A:
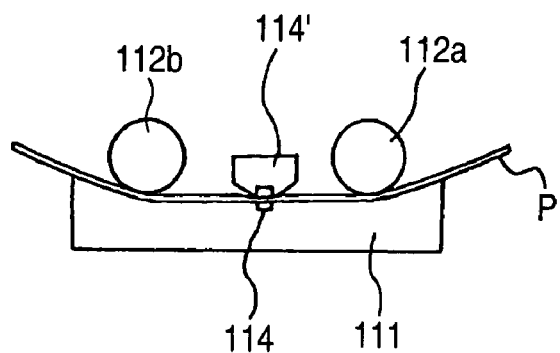
FIG. 4A is a sectional view of the image exposure portion according to a third embodiment of the invention.
Figure 4B:
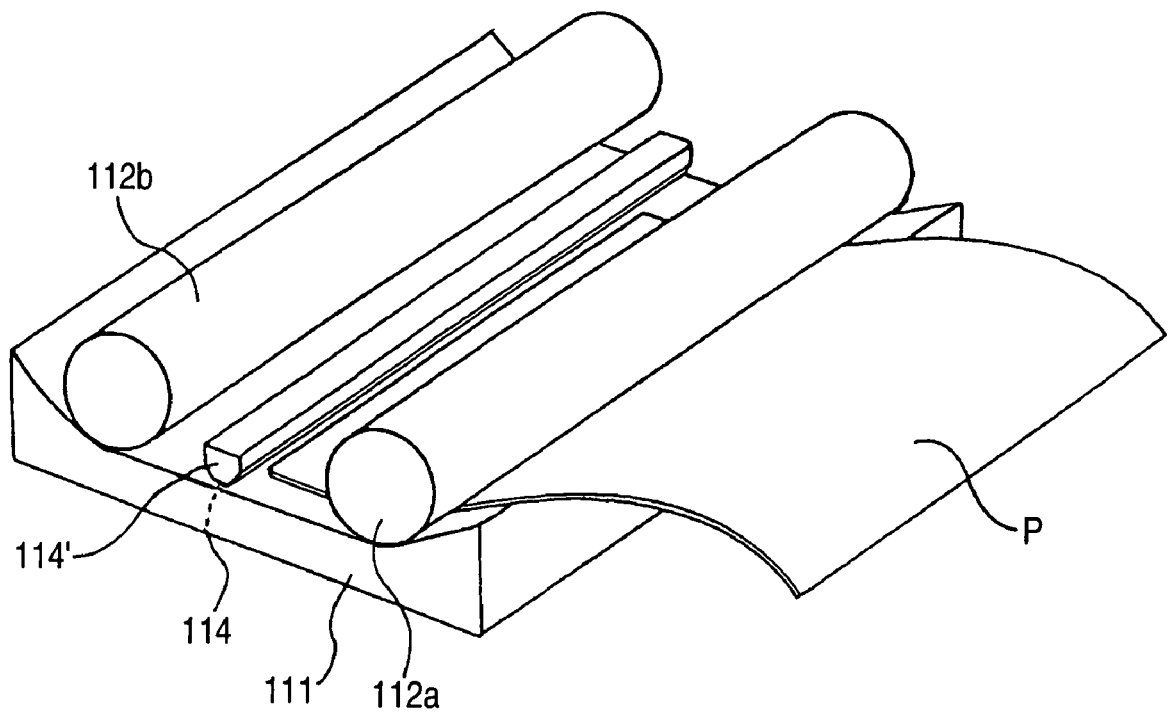
FIG. 4B is a perspective view of the image exposure portion according to the third embodiment of the invention.

FIGS. 4A and 4B are a sectional view and a perspective view of the image exposure portion according to a third embodiment of the invention.

In FIGS. 4A and 4B, the reference numeral 111 designates a guide plate for supporting the heat development recording material P; 112a and 112b, two drive rollers having axes arranged substantially in parallel to the scanning line; and 114, an organic EL light-emitting device having a large number of organic EL light-emitting elements arranged linearly in a row. The organic EL light-emitting device 114 is embedded in the guide plate 111. The description up to now is the same as in the first embodiment.

As is obvious from FIGS. 4A and 4B, the third embodiment is characterized in that another organic EL light-emitting device 114' than the organic EL light-emitting device 114, that is, an organic EL light-emitting device 114' having a large number of organic EL light-emitting elements arranged linearly in a row is provided on a side opposite to the organic EL light-emitting device 114 with respect to the heat development recording material P.

In this case, it is preferable that the wavelength of light emitted from the organic EL light-emitting device 114 is different from the wavelength of light emitted from the organic EL light-emitting device 114'. For example, a sensitive material exhibiting good sensitivity in the neighborhood of a short wavelength M (nm) is applied on a surface of the heat development recording material P which will be brought into contact with the organic EL light-emitting device 114 while a sensitive material exhibiting good sensitivity in the neighborhood of a wavelength N (nm) is applied on an opposite surface of the heat development recording material P which will be brought into contact with the organic EL light-emitting device 114', when M (nm) is the wavelength of light emitted from the organic EL light-emitting device 114, and N (nm) is the wavelength of light emitted from the organic EL light-emitting device 114'.

In the image exposure portion according to the third embodiment, the heat development recording material P is exposed to light as follows. When the surface of the heat development recording material P brought into contact with the organic EL light-emitting device 114 is exposed to light emitted from the organic EL light-emitting device 114, the opposite surface of the heat development recording material P is not exposed to the light because the sensitive material applied on the opposite surface of the heat development recording material P is not sensitive to the wavelength of the light even in the case where the light is transmitted through the heat development recording material P and reaches the opposite surface of the heat development recording material P. Similarly, when the surface of the heat development recording material P brought into contact with the organic EL light-emitting device 114' is exposed to light emitted from the organic EL light-emitting device 114', the opposite surface of the heat development recording material P is not exposed to the light even in the case where the light is transmitted through the heat development recording material P and reaches the opposite surface of the heat development recording material P. Accordingly, one and the same sharp images without fogging can be recorded on the front and rear surfaces of the heat development recording material P, respectively. That is, images easy to see can be obtained.

<Fourth Embodiment>

Figure 5:
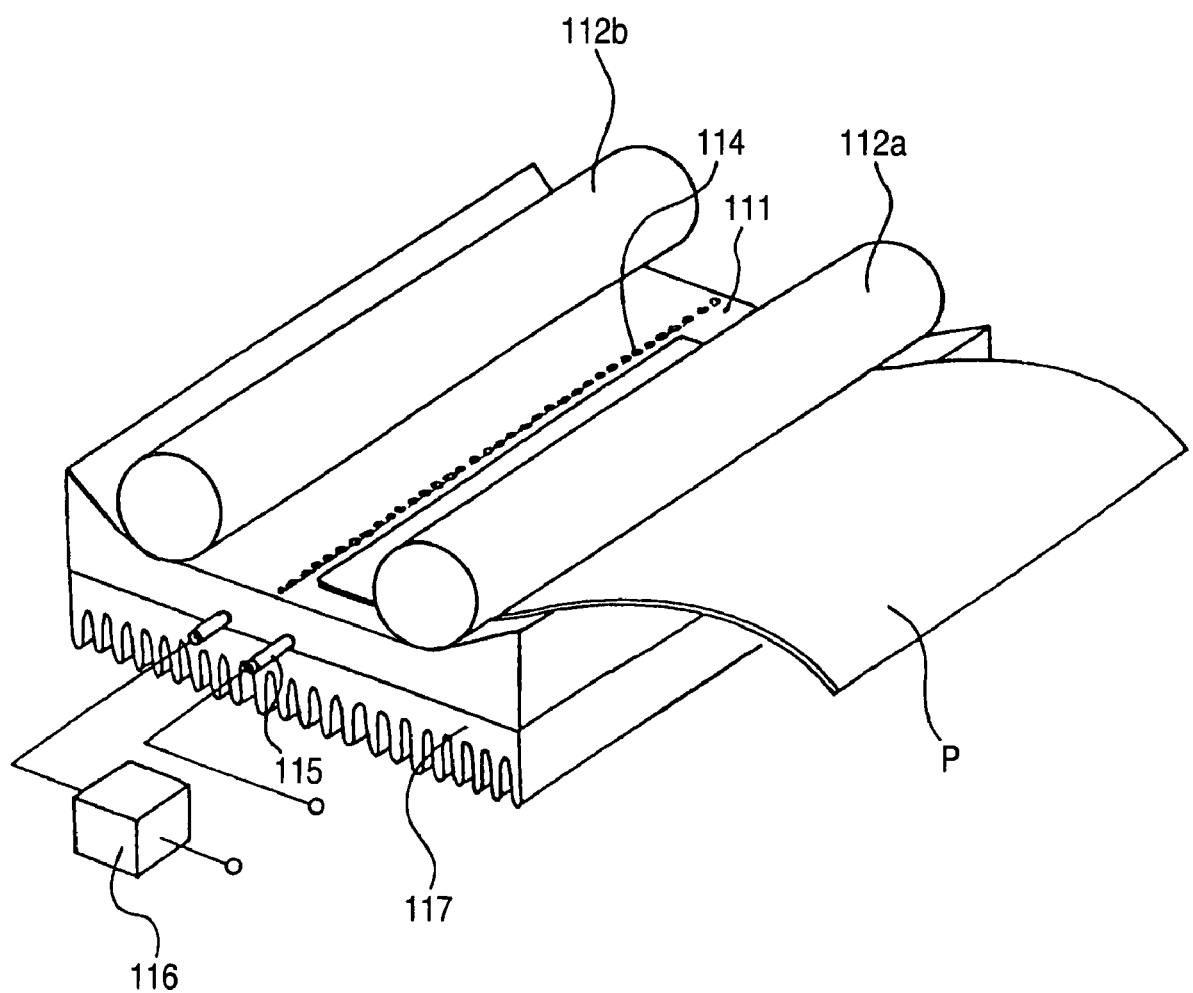
[FIG. 5]

FIG. 5 is a perspective view of the image exposure portion according to a fourth embodiment of the invention.

In FIG. 5, the reference numeral 111 designates a guide plate for supporting the heat development recording material P; 112a and 112b, two drive rollers having axes arranged substantially in parallel to the scanning line; and 114, an organic EL light-emitting device having a large number of organic EL light-emitting elements arranged linearly in a row. The organic EL light-emitting device 114 is embedded in the guide plate 111. The description up to now is the same as in the first embodiment.

As is obvious from FIG. 5, the fourth embodiment is characterized in that a heater 115 is provided in the neighborhood of a portion of the guide plate 111 where the organic EL light-emitting device 114 is embedded, and that the heater 115 is connected to an electric supply through a temperature regulator 116 which is provided for regulating the temperature of the heater 115. In the recording apparatus, the temperature of the organic EL light-emitting device 114 is detected by a temperature sensor not shown in FIG. 5. The detected value is sent to the temperature regulator 116. In the temperature regulator 116, the detected value is compared with a predetermined set value, so that the temperature is regulated to eliminate the difference (error) between the detected value and the set value.

Although this embodiment has shown the case where the temperature regulator 116 is used as an exclusive temperature regulator, the invention may be applied to the case where the CPU of the control portion F serves also as a temperature regulator.

Besides the heater 115 and the temperature regulator 116, a heat sink made of a cooling fan 117 is attached to the guide plate 111. The heater 115 is cooled at ordinary time but heated only at heating time so that the temperature can be kept at a predetermined value.

When a heat sink made of a peltier element is used in place of the cooling fan 117, the cooling effect can be improved more greatly.

Although the embodiments have been described on the case where organic EL light-emitting elements are used as an example, the invention is not limited thereto. It is a matter of course that semiconductor light-emitting elements such as light-emitting diodes are used in place of the organic EL light-emitting elements.

As described above, in accordance with the invention, the image exposure portion is formed so that organic EL light-emitting elements or light-emitting diodes are embedded in the main scanning direction in the sub scanning type guide plate. Accordingly, when light-emitting elements are switched on simultaneously to emit light in accordance with image data, recording in the main scanning direction can be made simultaneously. High-speed exposure can be made compared with scanning using laser exposure according to the background art. Moreover, because scanning is not required, the wide space for moving the laser beam by using a polygon mirror or the like can be dispensed with. Accordingly, the apparatus can be made thin as a whole, so that the height of the portion ranging from the pair of ejection rollers 63 to the ejection tray 16 in the background-art apparatus shown in FIG. 6 can be reduced to height h in the apparatus shown in FIG. 1.

Figure 6:
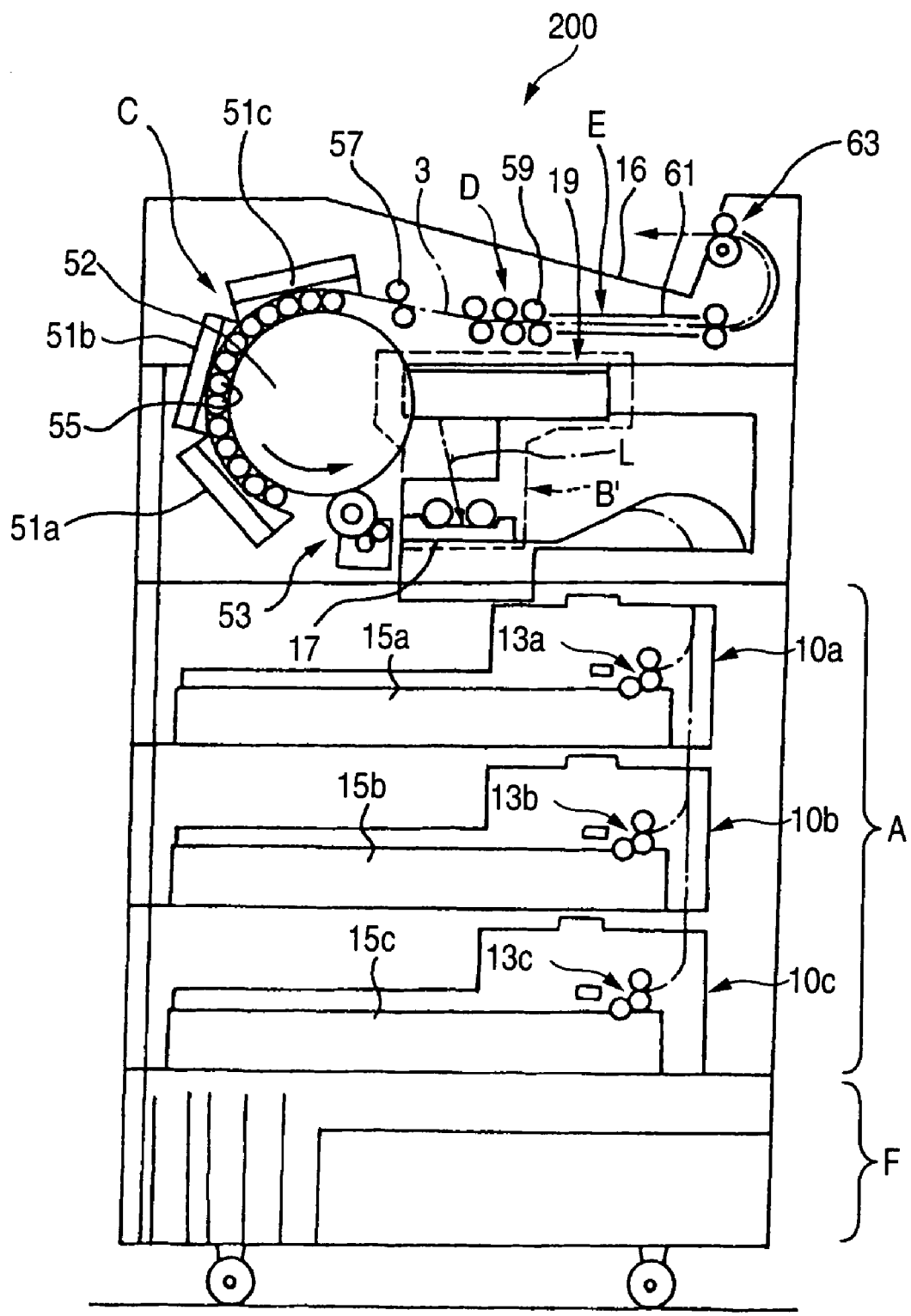
[FIG. 6]
Figure 7:
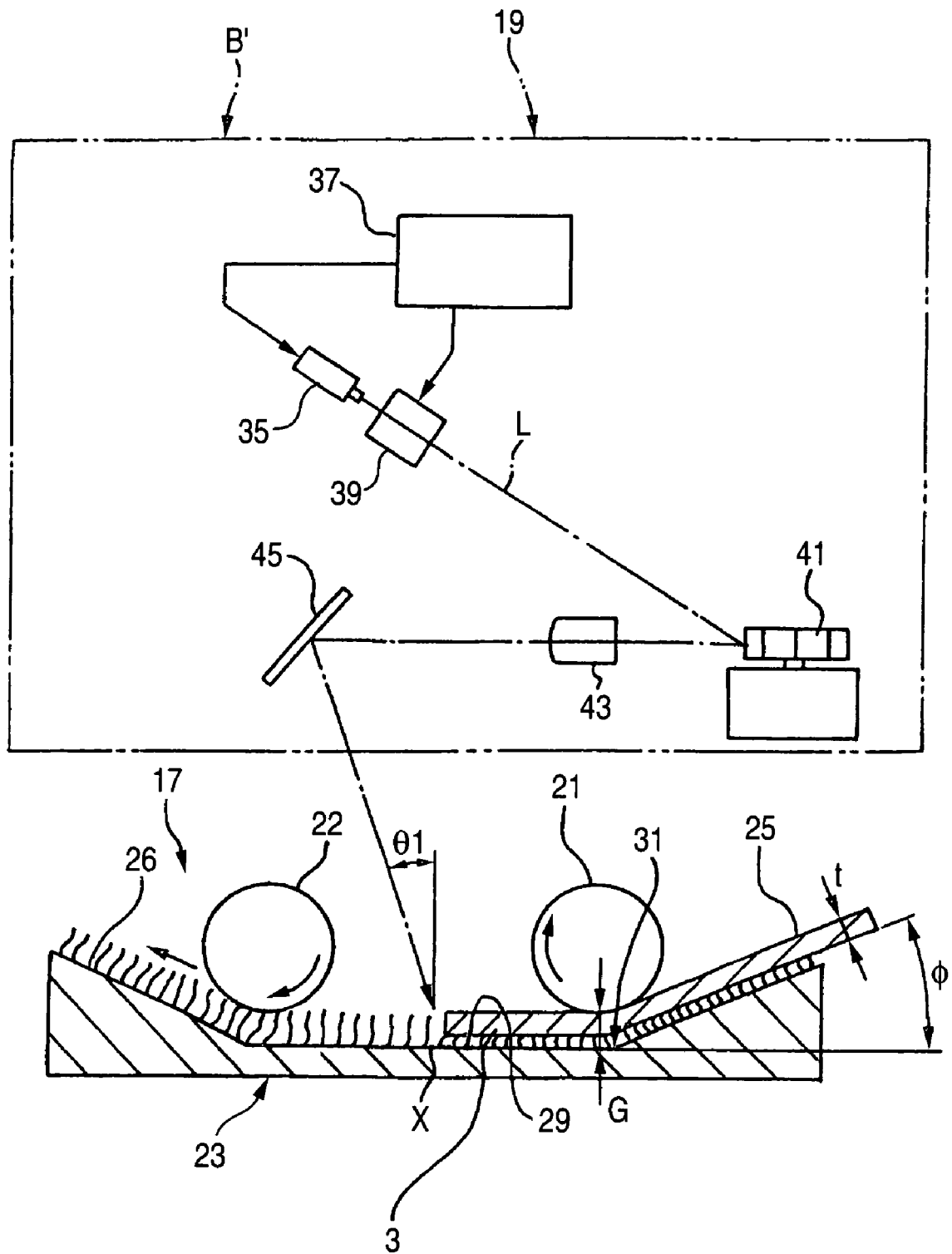
[FIG. 7]
Figure 8:
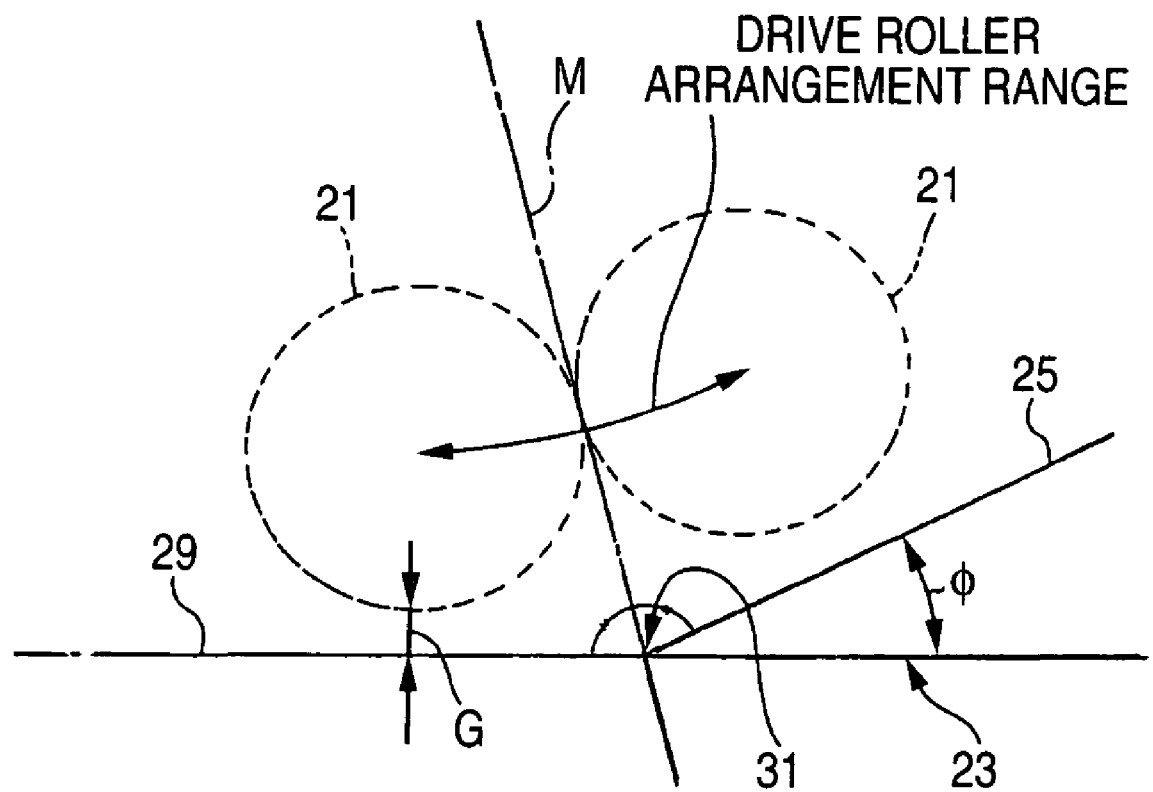
[FIG. 8]

In the background-art apparatus shown in FIG. 6, the means for pressing the heat development recording material cannot be disposed just above the heat development recording material because the vacant space for applying the laser beam on the heat development recording material needs to be provided above the heat development recording material. Accordingly, the heat development recording material often floats up from the record point on the guide plate. In this case, recording defects such as image blurring occur.

On the contrary, in accordance with the invention, because the rubber roller is disposed on a side opposite to the light-emitting elements, the heat development recording material can be pressed surely. Moreover, when a black rubber roller is used as the rubber roller, reflection can be suppressed so that a sharp image can be obtained.

Moreover, because the organic EL light-emitting elements are embedded in the guide plate, the surface of the guide plate is so smooth that the guide plate can be cleaned easily. Accordingly, maintenance of the heat development recording apparatus can be made easily.

Moreover, because two light-emitting element arrays may be disposed on opposite sides of the heat development recording material so that the two light-emitting element arrays emit light with different wavelengths respectively, one and the same sharp image without fogging can be recorded on the front and rear surfaces of the heat development recording material P, respectively. That is, an image easy to see can be obtained.

In addition, because the temperature regulator for regulating the temperature of the guide plate to a predetermined temperature and the heat sink are provided, the temperature of the image exposure portion can be kept at a predetermined value accurately. Accordingly, a stable image can be obtained.

This application is based on Japanese Patent application JP 2003-333946, filed Sep. 25, 2003, the entire content of which is hereby incorporated by reference, the same as if set forth at length.

What is claimed is:

1. A heat developing apparatus comprising an image exposure portion in which a heat development recording material containing a heat development photosensitive material or a photosensitive heat-sensitive recording material is exposed to light to thereby form a latent image, and a heat developing portion in which heat is applied to said latent image to thereby develop said latent image, wherein:

said image exposure portion is provided as a sub scanning structure including a planar guide plate disposed on one side with respect to a carrying path of said heat development recording material for supporting the heat development recording material, and two drive rollers disposed on other side with respect to said carrying path and having axes substantially parallel to said carrying path and crossing a carrying direction of said heat development recording material substantially perpendicularly; and a plurality of light-emitting elements are embedded in said guide plate so as to be arranged in a main scanning direction to form a light-emitting element array.

2. The heat developing apparatus according to claim 1, wherein said light-emitting elements are organic electroluminescence elements or light-emitting diodes.

3. The heat developing apparatus according to claim 1, wherein a pressure roller is provided on a side opposite to said light-emitting element array with respect to said heat development recording material carried to said image exposure portion.

4. The heat developing apparatus according to claim 2, wherein a pressure roller is provided on a side opposite to said light-emitting element array with respect to said heat development recording material carried to said image exposure portion.

5. The heat developing apparatus according to claim 3, wherein said pressure roller is a black rubber roller.

6. The heat developing apparatus according to claim 4, wherein said pressure roller is a black rubber roller.

7. The heat developing apparatus according to claim 1, wherein light-emitting elements as another light-emitting element array are further provided on a side opposite to said light-emitting element array with respect to said heat development recording material carried to said image exposure portion.

8. The heat developing apparatus according to claim 2, wherein light-emitting elements as another light-emitting element array are further provided on a side opposite to said light-emitting element array with respect to said heat development recording material carried to said image exposure portion.

9. The heat developing apparatus according to claim 7, wherein said two light-emitting element arrays disposed on opposite sides with respect to said heat development recording material emit light with wavelengths different from each other.

10. The heat developing apparatus according to claim 8, wherein said two light-emitting element arrays disposed on opposite sides with respect to said heat development recording material emit light with wavelengths different from each other.

11. The heat developing apparatus according to claim 1, wherein a temperature regulator is provided for regulating a temperature of said guide plate at a predetermined temperature.

12. The heat developing apparatus according to claim 11, wherein a heat sink is attached to said guide plate.

* * * * *